(12) United States Patent
Richgels et al.

(10) Patent No.: US 8,693,131 B1
(45) Date of Patent: *Apr. 8, 2014

(54) WRITING AND READING USER DATA USING SERVO SPIRALS

(75) Inventors: Jerome F. Richgels, Sunnyvale, CA (US); Henri Sutioso, Saratoga, CA (US); Allen Cheng Wu Hu, Fremont, CA (US); Scott A. Hughes, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,309

(22) Filed: Jul. 16, 2012

Related U.S. Application Data

(63) Continuation of application No. 12/557,590, filed on Sep. 11, 2009, now Pat. No. 8,223,452.

(60) Provisional application No. 61/097,386, filed on Sep. 16, 2008, provisional application No. 61/104,886, filed on Oct. 13, 2008.

(51) Int. Cl.
*G11B 21/02* (2006.01)
(52) U.S. Cl.
USPC .............. 360/75; 360/48; 360/51; 360/77.02; 360/77.04; 360/77.08
(58) Field of Classification Search
None
See application file for complete search history.

(56) References Cited

U.S. PATENT DOCUMENTS

| | | | |
|---|---|---|---|
| 5,668,679 A * | 9/1997 | Swearingen et al. | 360/75 |
| 6,525,892 B1 * | 2/2003 | Dunbar et al. | 360/31 |
| 6,738,205 B1 | 5/2004 | Moran et al. | |
| 6,965,489 B1 * | 11/2005 | Lee et al. | 360/75 |
| 6,992,851 B1 * | 1/2006 | Cloke | 360/75 |
| 7,006,316 B1 | 2/2006 | Sargenti et al. | |
| 7,123,435 B1 * | 10/2006 | Schreck | 360/78.08 |
| 7,233,455 B1 | 6/2007 | Rewerts et al. | |
| 7,333,280 B1 | 2/2008 | Lifchits et al. | |
| 7,411,758 B1 | 8/2008 | Cheung et al. | |
| 7,471,480 B2 * | 12/2008 | Chung et al. | 360/75 |
| 7,477,472 B2 * | 1/2009 | Sado et al. | 360/75 |
| 7,623,313 B1 * | 11/2009 | Liikanen et al. | 360/75 |
| 7,646,559 B1 * | 1/2010 | Cheung et al. | 360/75 |
| 7,667,911 B2 * | 2/2010 | Lau | 360/51 |
| 7,773,334 B1 | 8/2010 | Rutherford | |
| 7,791,832 B1 | 9/2010 | Cheung et al. | |
| 7,839,591 B1 | 11/2010 | Weerasooriya et al. | |
| 7,852,593 B2 | 12/2010 | Mizukoshi et al. | |
| 8,023,216 B1 * | 9/2011 | Cheung et al. | 360/51 |
| 8,027,117 B1 * | 9/2011 | Sutardja et al. | 360/75 |
| 8,223,452 B1 * | 7/2012 | Richgels et al. | 360/75 |
| 2007/0081268 A1 * | 4/2007 | Jung et al. | 360/73.01 |
| 2009/0002871 A1 * | 1/2009 | Matsunaga et al. | 360/76 |

* cited by examiner

*Primary Examiner* — Dismery Mercedes

(57) ABSTRACT

A system includes a self-servo-write (SSW) module, a read module, and a write module. The SSW module writes servo spirals on a magnetic medium of a hard disk drive (HDD) via a write head of the HDD. The read module reads the servo spirals via a read head of the HDD and generates read signals. The write module writes non-servo data on the magnetic medium via the write head based on the read signals before the SSW module writes servo wedges on the magnetic medium.

20 Claims, 11 Drawing Sheets

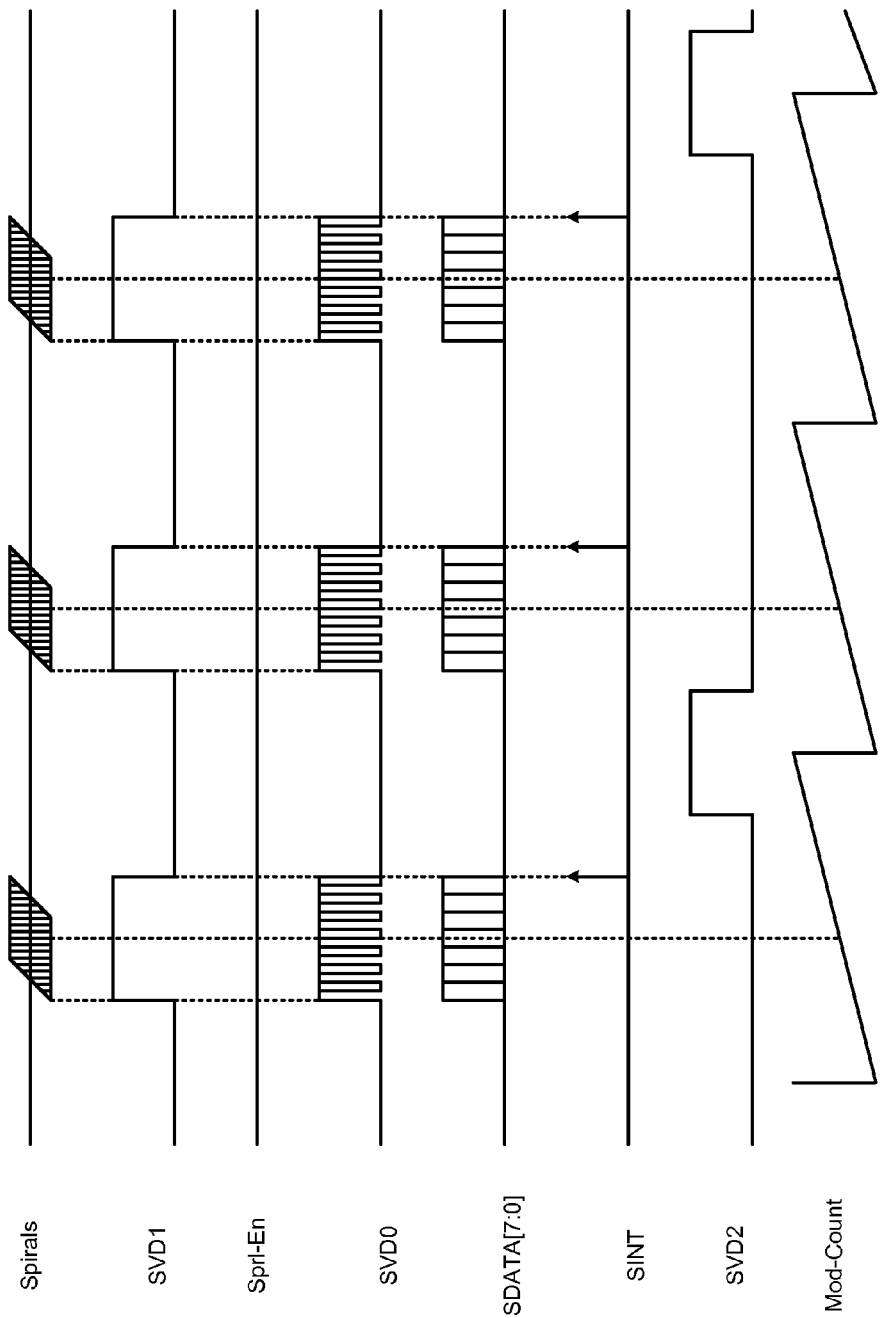

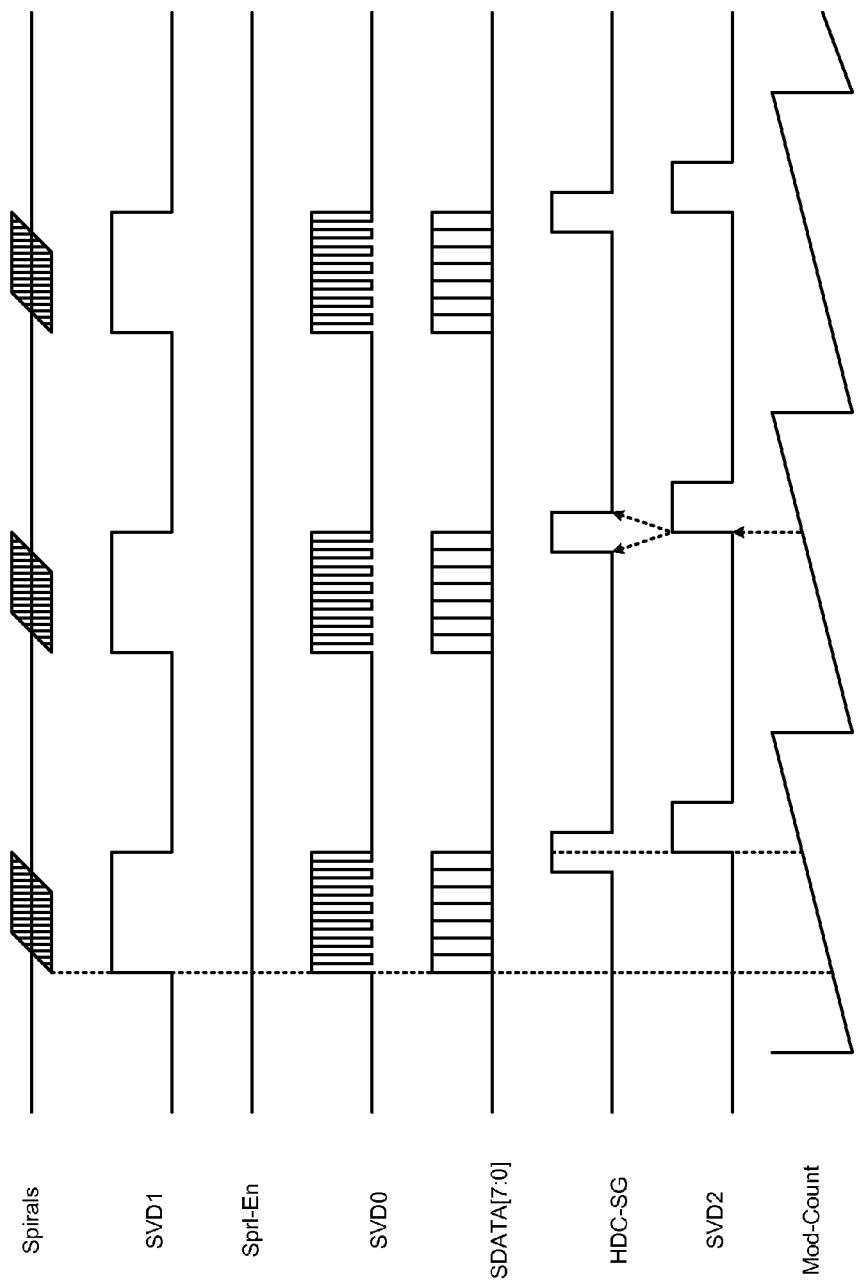

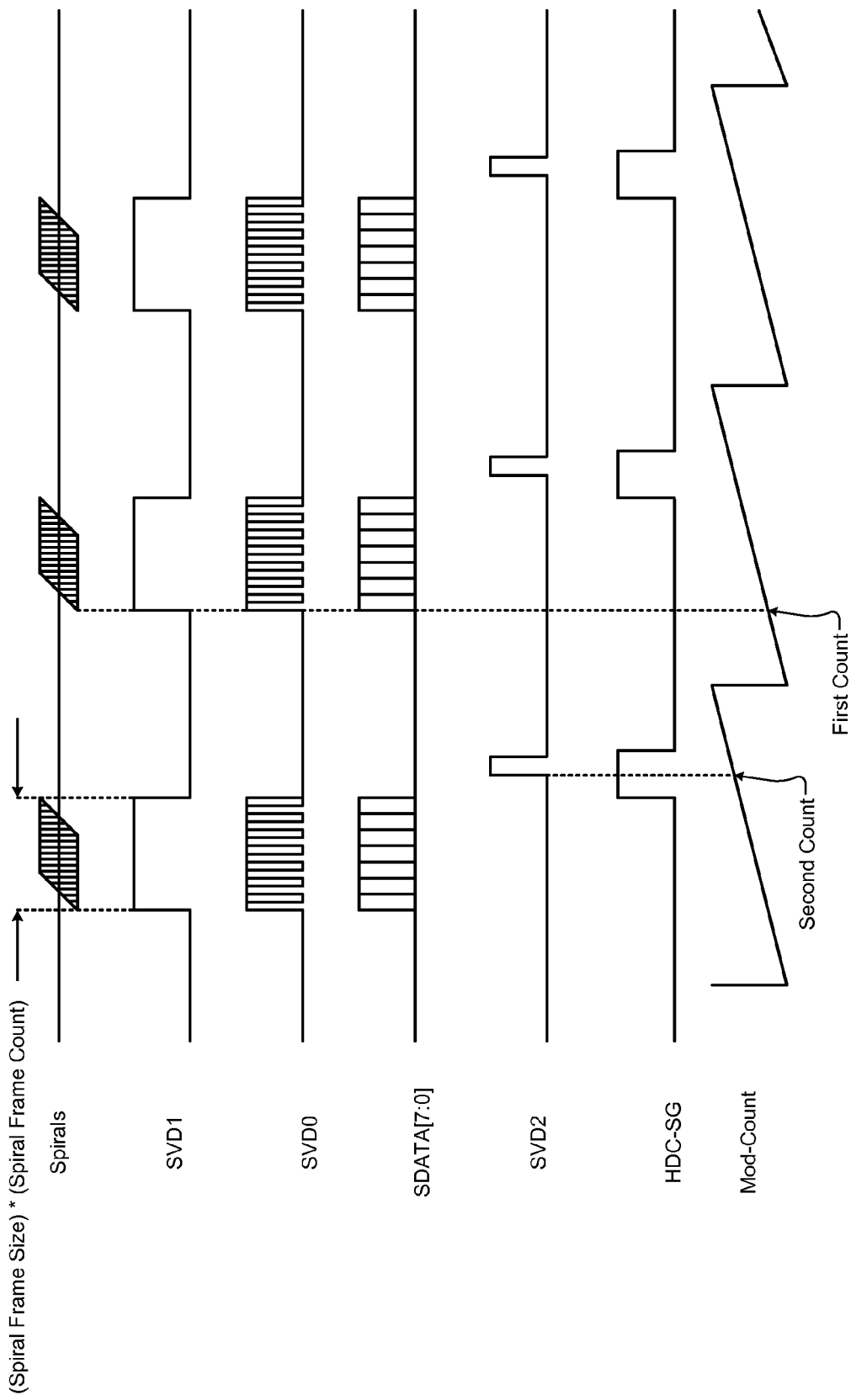

WRITING AND READING USER DATA USING SERVO SPIRALS

CROSS-REFERENCE TO RELATED APPLICATIONS

This application is a continuation of U.S. patent application Ser. No. 12/557,590, filed Sep. 11, 2009, which claims the benefit of U.S. Provisional Application Nos. 61/097,386, filed Sep. 16, 2008 and 61/104,886, filed Oct. 13, 2008. The disclosures of the above applications are incorporated herein by reference in their entirety.

FIELD

The present disclosure relates to hard disk drives (HDDs) and more particularly to writing and reading user data on the HDDs based on prewritten servo spirals.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a hard disk drive (HDD) 10 includes a hard disk assembly (HDA) 12 and a HDD printed circuit board (PCB) 14. The HDA 12 includes one or more circular platters 16, which have magnetic surfaces that are used to store data magnetically. Data is stored in binary form as a magnetic field of either positive or negative polarity. The platters 16 are arranged in a stack, and the stack is rotated by a spindle motor 18. At least one read/write head (hereinafter, "head") 20 reads data from and writes data on the magnetic surfaces of the platters 16.

Each head 20 includes a write element, such as an inductor, that generates a magnetic field and a read element, such as a magneto-resistive (MR) element, that senses the magnetic field on the platters 16. The head 20 is mounted at a distal end of an actuator arm 22. An actuator, such as a voice coil motor (VCM) 24, moves the actuator arm 22 relative to the platters 16.

The HDA 12 includes a preamplifier device 26 that amplifies signals received from and sent to the head 20. When writing data, the preamplifier device 26 generates a write current that flows through the write element of the head 20. The write current is switched to produce a positive or negative magnetic field on the magnetic surfaces of the platters 16. When reading data, the magnetic fields stored on the magnetic surfaces of the platters 16 induce low-level analog signals in the read element of the head 20. The preamplifier device 26 amplifies the low-level analog signals and outputs amplified analog signals to a read/write (R/W) channel (hereinafter, "read channel") module 28.

The HDD PCB 14 includes the read channel module 28, a hard disk controller (HDC) module 30, a processor 32, a spindle/VCM driver module 34, volatile memory 36, non-volatile memory 38, and an input/output (I/O) interface 40. During write operations, the read channel module 28 may encode the data to increase reliability by using error-correcting codes (ECC) such as run length limited (RLL) code, Reed-Solomon code, etc. The read channel module 28 then transmits the encoded data to the preamplifier device 26. During read operations, the read channel module 28 receives analog signals from the preamplifier device 26. The read channel module 28 converts the analog signals into digital signals, which are decoded to recover the original data.

The HDC module 30 controls operation of the HDD 10. For example, the HDC module 30 generates commands that control the speed of the spindle motor 18 and the movement of the actuator arm 22. The spindle/VCM driver module 34 implements the commands and generates control signals that control the speed of the spindle motor 18 and the positioning of the actuator arm 22. Additionally, the HDC module 30 communicates with an external device (not shown), such as a host adapter within a host device, via the I/O interface 40. The HDC module 30 may receive data to be stored from the external device and may transmit retrieved data to the external device.

The processor 32 processes data, including encoding, decoding, filtering, and/or formatting. Additionally, the processor 32 processes servo or positioning information to position the heads 20 over the platters 16 during read/write operations. Servo, which is stored on the platters 16, ensures that data is written to and read from correct locations on the platters 16.

Additionally, the HDD PCB 14 includes a self-servo write (SSW) module 42. The SSW module 42 writes servo on the platters 16 using the heads 20. The SSW module 42 writes servo before user data can be stored on the HDD 10. The SSW module 42 may be implemented in the read channel module 28.

More specifically, the SSW module 42 initially writes servo spirals on the platters 16. Subsequently, based on the servo spirals, the SSW module 42 writes servo wedges before user data can be written on the platters 16. The servo wedges extend radially from an inner diameter (ID) to an outer diameter (OD) of the platters 16. The servo wedges are equally spaced from each other like spokes of a wheel. The servo wedges are interleaved with user data that is written between adjacent servo wedges.

SUMMARY

A system comprises a self-servo-write (SSW) module, a read module, and a write module. The SSW module writes servo spirals on a magnetic medium of a hard disk drive (HDD) via a write head of the HDD. The read module reads the servo spirals via a read head of the HDD and generates read signals. The write module writes non-servo data on the magnetic medium via the write head based on the read signals before the SSW module writes servo wedges on the magnetic medium.

In other features, the write module writes the non-servo data without writing over the servo spirals.

In other features, the system further comprises a hard disk controller (HDC) module, a spiral demodulator module, and a synchronization module. The HDC module generates a first control signal that controls the write module. The spiral demodulator module demodulates the read signals and generates a second control signal based on the read signals. The synchronization module synchronizes the first and second control signals. The write module writes the non-servo data based on the first and second control signals.

In other features, the read module reads the non-servo data from the magnetic medium via the read head. The SSW module writes the servo wedges based on the second control signal and information derived from reading the non-servo data.

In other features, the system further comprises a servo read module and a servo control module. The servo read module reads the servo wedges and detects sync marks. The servo control module generates a sync mark signal based on the sync marks. The synchronization module synchronizes the first control signal to the sync mark signal. The write module writes user data on the magnetic medium via the write head based on the first control signal and the sync mark signal.

In still other features, a method comprises writing servo spirals on a magnetic medium of a hard disk drive (HDD) via a write head of the HDD and reading the servo spirals via a read head of the HDD and generating read signals. The method further comprises writing non-servo data on the magnetic medium via the write head based on the read signals before writing servo wedges on the magnetic medium.

In other features, the method further comprises writing the non-servo data without writing over the servo spirals.

In other features, the method further comprises generating a first control signal, demodulating the read signals, and generating a second control signal based on the read signals. The method further comprises synchronizing the first and second control signals and writing the non-servo data based on the first and second control signals.

In other features, the method further comprises reading the non-servo data from the magnetic medium via the read head and writing the servo wedges based on the second control signal and information derived from reading the non-servo data.

In other features, the method further comprises reading the servo wedges and detecting sync marks, generating a sync mark signal based on the sync marks, and synchronizing the first control signal to the sync mark signal. The method further comprises writing user data on the magnetic medium via the write head based on the first control signal and the sync mark signal.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 2B is a timing diagram of interface signals between a read channel module and a HDC module of the system of FIG. 2A;

FIGS. 3B-3E depict timing diagrams of signals used by the system of FIG. 3A when writing/reading the non-servo data based on the servo spirals.

DESCRIPTION

Figure 1:
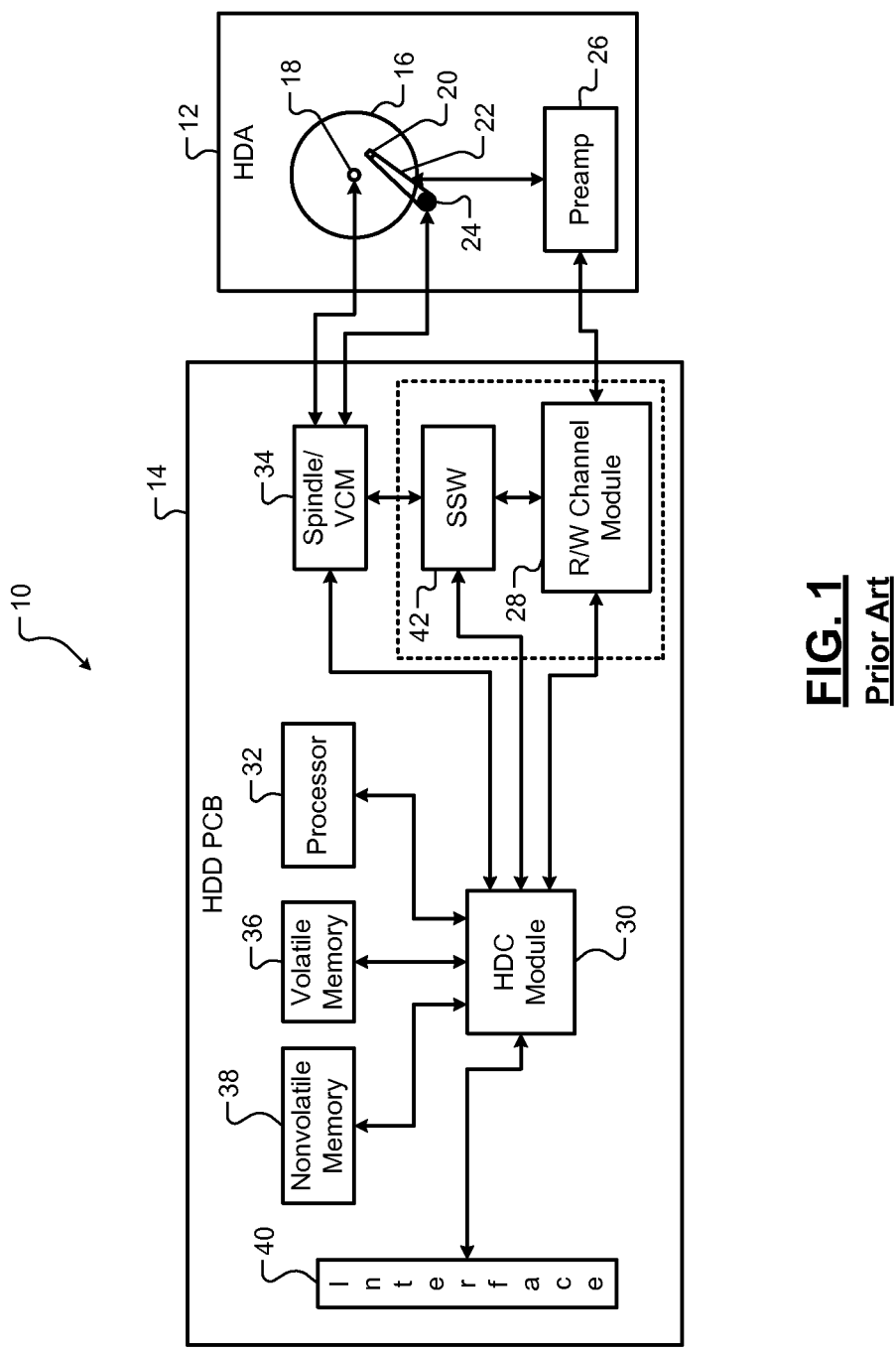
FIG. 1 is a functional block diagram of a hard disk drive (HDD)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The present disclosure relates to writing non-servo data on a hard disk drive (HDD) based on servo spirals that are pre-written on the HDD. The non-servo data may include test patterns. Additionally, the non-servo data may include user data that is typically written during normal operation of the HDD based on servo wedges written on the HDD. The non-servo data excludes servo wedges. The non-servo data may be generated internally within the HDD or may be received from a source (e.g., a host) external to the HDD.

More specifically, the non-servo data is written before writing the servo wedges on the HDD based on the servo spirals. The non-servo data is read back and analyzed. Information derived from writing and reading the non-servo data is used to write the servo wedges based on the servo spirals. Accordingly, the non-servo data is written without writing over the servo spirals.

The disclosure is organized as follows. Initially, writing servo wedges based on servo spirals is explained. Thereafter, writing user data based on servo wedges is explained. Subsequently, writing non-servo data based on servo spirals is described.

Figure 2A:
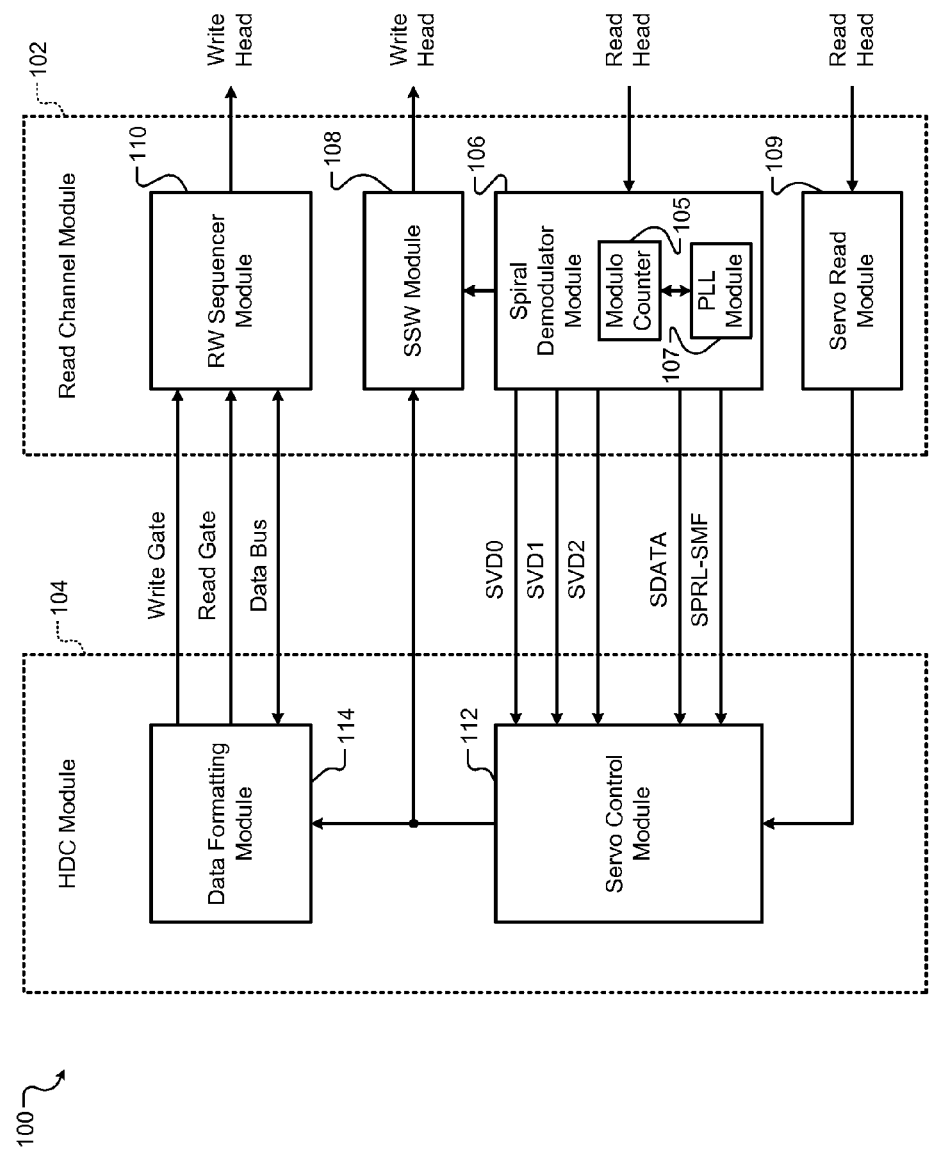
FIG. 2A is a functional block diagram of a system for writing servo wedges based on servo spirals and writing user data based on the servo wedges.
Figure 2C:
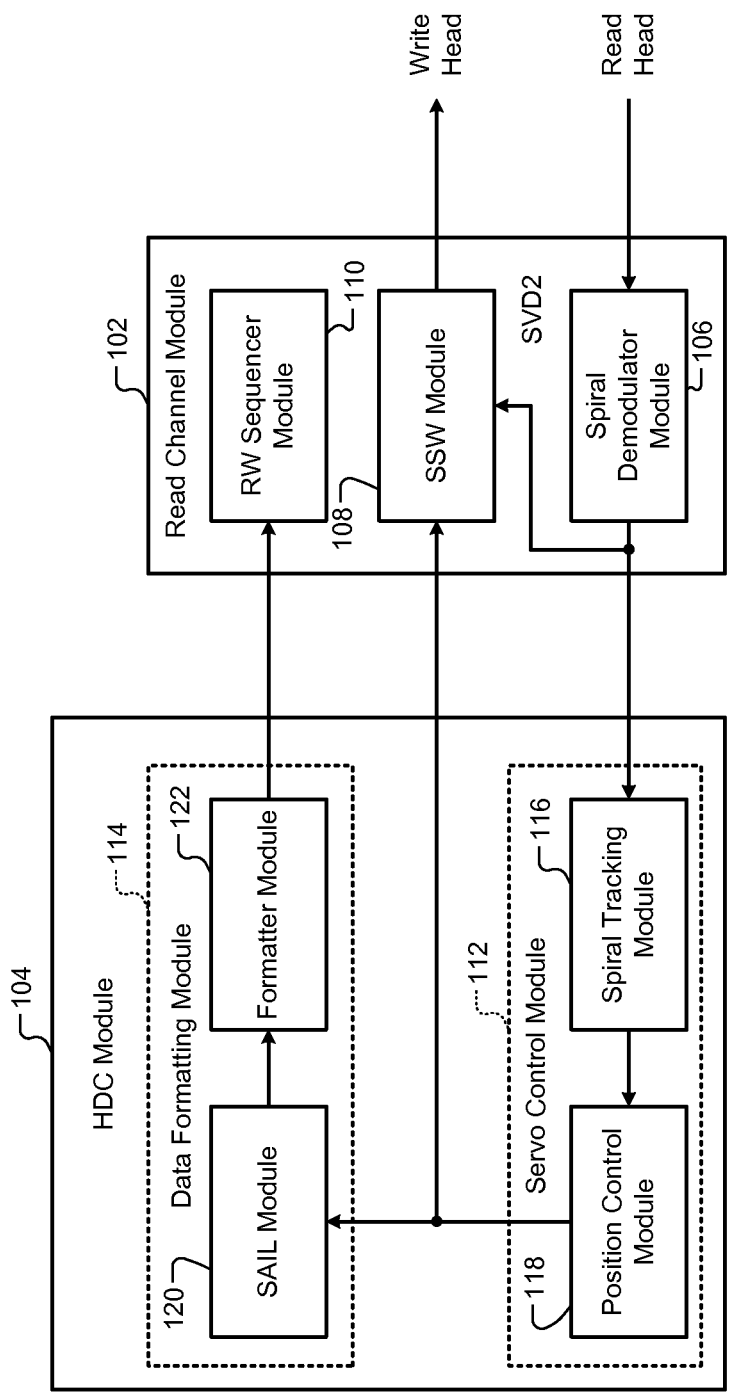
FIG. 2C is a functional block diagram of portions of the system of FIG. 2A that write the servo wedges based on the servo spirals.
Figure 2D:
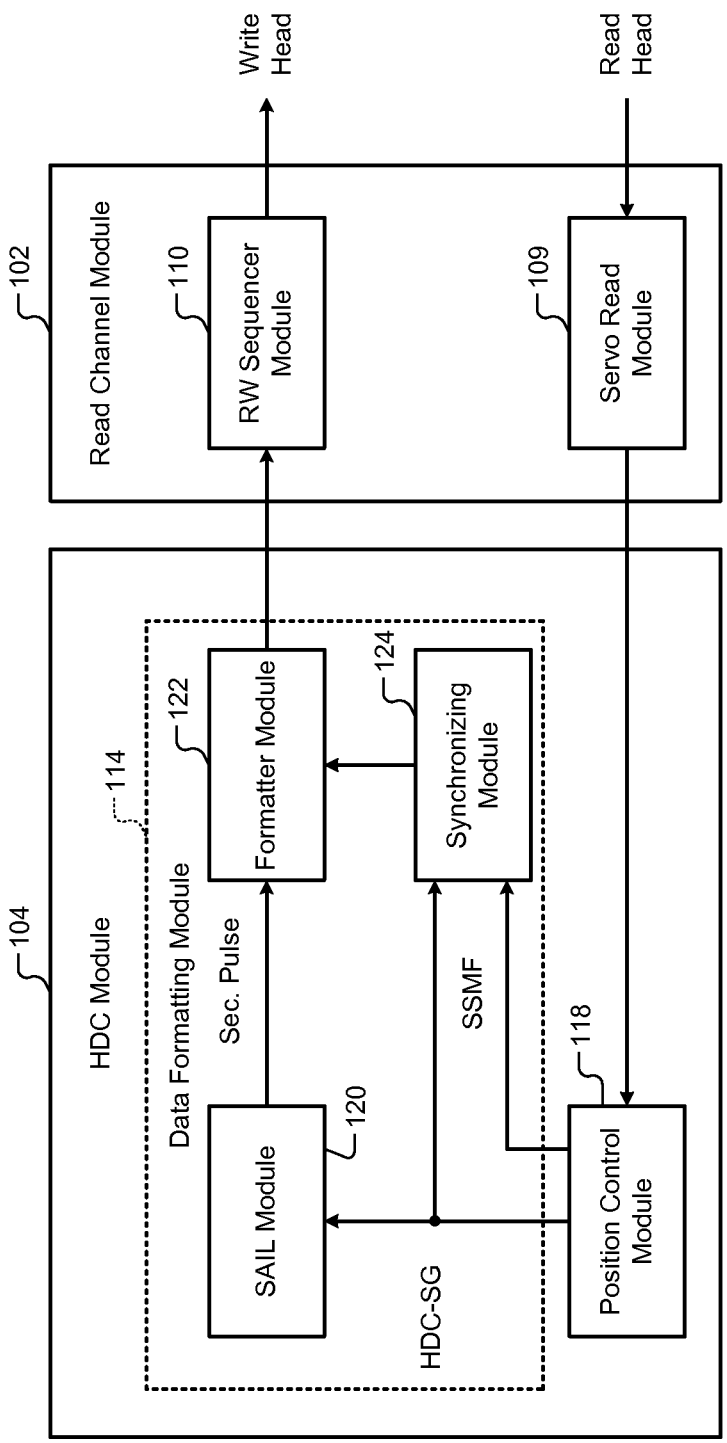
FIG. 2D is a functional block diagram of portions of the system of FIG. 2A that write/read user data based on the servo wedges.

Referring now to FIGS. 2A-2D, a system 100 for writing servo wedges and user data is shown. In FIG. 2A, the system 100 comprises a read channel module 102 and a hard disk controller (HDC) module 104. In FIG. 2B, a timing diagram of interface signals between the read channel module 102 and the HDC module 104 is shown. In FIG. 2C, portions of the system 100 that write servo wedges based on servo spirals are shown. In FIG. 2D, portions of the system 100 that write/read user data based on servo wedges are shown.

Referring to FIG. 2A, the read channel module 102 comprises a spiral demodulator module 106, a self-servo-write (SSW) module 108, a servo read module 109, and a read/write (RW) sequencer module 110. The HDC module 104 comprises a servo control module 112 and a data formatting module 114. As shown in FIG. 2C, the servo control module 112 comprises a spiral tracking module 116 and a position control module 118. Additionally, the data formatting module 114 comprises a servo and ID-less (SAIL) module 120 and a formatter module 122. In FIG. 2C, only those portions of the system 100 that write servo wedges are shown. Accordingly, for simplicity, the servo read module 109 is omitted from the read channel module 102 in FIG. 2C. The read channel module 102 and the HDC module 104 may be implemented in a system on chip (SOC).

Initially, the SSW module 108 writes the servo spirals via a write head of the HDD (not shown). The spiral demodulator module 106 and the servo control module 112 generate a first set of position and timing signals based on the servo spirals. Using the first set of position and timing signals, the SSW module 108 writes servo wedges based on the servo spirals.

Subsequently, the servo read module 109 reads the servo wedges. The servo control module 112 generates a second set of position and timing signals based on the servo wedges. Using the second set of position and timing signals, the data formatting module 114 and the RW sequencer module 110 write/read user data to/from the HDD.

When writing the servo wedges, the read channel module 102 reads the servo spirals via a read head of the HDD (not shown) and generates read signals. The spiral demodulator module 106 demodulates the read signals and generates SVD0, SVD1, SVD2, SDATA, and SPRL-SMF signals.

SVD0 is a clock generated based on the read signals. SVD1 is a demodulation window used to read each servo spiral. SVD2 is a synchronization signal used to synchronize the HDC module 104 to the servo spirals and to disk rotation. SDATA is spiral data that includes amplitude information of the servo spirals and time stamp information of sync marks of the servo spirals. SPRL-SMF indicates when a spiral sync mark is found.

The spiral demodulator module 106 comprises a modulo counter (Mod-Count) 105 and a phase-locked loop (PLL) module 107. The modulo counter 105 synchronizes positioning of the demodulation window over the servo spirals during each revolution of the HDD. Specifically, the PLL module 107 synchronizes a count of the modulo counter 105 to a peak of a servo spiral. The count indicates when the demodulation window is centered over the servo spiral. The read head reads the servo spiral when the modulo counter 105 reaches the count.

The spiral demodulator module 106 demodulates the read signals and generates the spiral clock (SVD0) and the spiral data (SDATA). Additionally, the spiral demodulator module 106 generates the SVD2 signal based on the read signals. The SVD2 signal is generated at the end of each demodulation window. The SVD2 signal is synchronized to the modulo counter 105. Accordingly, the SVD2 signal is synchronized to the servo spirals and to the disk rotation.

The signals SVD0, SVD1, SVD2, SDATA, and SPRL-SMF are output to the servo control module 112. The spiral clock SVD0 latches the spiral data (SDATA) into registers of the spiral tracking module 116. The spiral tracking module 116 tracks the servo spirals based on the spiral data. For example, the spiral tracking module 116 assigns identification numbers to the servo spirals and counts the servo spirals during each revolution. The spiral tracking module 116 generates an interrupt (SINT) when the spiral data is latched. The position control module 118 processes the spiral data when the interrupt is received. The position control module 118 determines a rotational position of the HDD based on the latched spiral data.

The SSW module 108 receives the rotational position information and the SVD2 signal. The SVD2 signal serves as a write enable signal for the SSW module 108. The SVD2 signal indicates when the SSW module 108 can begin writing a servo wedge after each servo spiral. When the SVD2 signal is received, the SSW module 108 writes the servo wedge at the rotational position received from the position control module 118.

When writing servo wedges, a spiral enable (Splr-En) signal is generated to facilitate verification of the servo wedges. The spiral enable signal is held low when a servo wedge is read back. The spiral enable signal is held high when a spiral is read.

The data formatting module 114 and the RW sequencer module 110 write/read user data to/from the HDD based on the servo wedges. The servo read module 109 reads the servo wedges when writing/reading user data. The position control module 118 generates the rotational position of the disk based on the servo information read by the servo read module 109. Additionally, the position control module 118 generates a servo sync mark found (SSMF) signal based on the servo information read by the servo read module 109. The SSMF signal synchronizes the HDC module 104 to the disk rotation.

Additionally, the position control module 118 generates a HDC servo gate (HDC-SG) signal after each servo spiral. The HDC-SG signal serves as a write enable signal for the data formatting module 114. The SAIL module 120 generates a sector pulse when the HDC-SG signal is received. The data formatting module 114 comprises a synchronizing module 124. The synchronizing module 124 synchronizes the HDC-SG signal to the SSMF signal as follows.

The HDC-SG signal is gated by the SSMF signal to the formatter module 122. For example, the HDC-SG signal is gated by a leading edge of the SSMF signal. The HDC-SG signal is centered on the leading edge of the SSMF signal. The formatter module 122 is triggered by the HDC-SG signal when writing/reading user data. For example, the formatter module 122 is triggered by a trailing edge of the HDC-SG signal.

When writing user data to the HDD, the formatter module 122 formats the user data when the sector pulse is received. The formatter module 122 outputs formatted user data to the RW sequencer module 110 via a data bus. The formatter module 122 outputs a write gate signal to the RW sequencer module 110. The RW sequencer module 110 writes the formatted user data to the HDD using write sequences.

Conversely, when reading user data from the HDD, the formatter module 122 outputs a read gate signal to the RW sequencer module 110 on receiving the sector pulse. The RW sequencer module 110 reads the user data from the HDD using read sequences. The RW sequencer module 110 outputs the user data to the formatter module 122 via the data bus.

If user data is to be written based on servo spirals (i.e., before servo wedges are written), the SSMF signal is unavailable to synchronize the HDC module 104 to the disk rotation. The HDC module 104, however, can be synchronized to the disk rotation using the SVD2 signal instead. Accordingly, user data can be written using the servo spirals as reference instead of using the servo wedges as reference. Specifically, the HDC-SG signal is synchronized to the SVD2 signal instead of the SSMF signal.

Figure 3A:
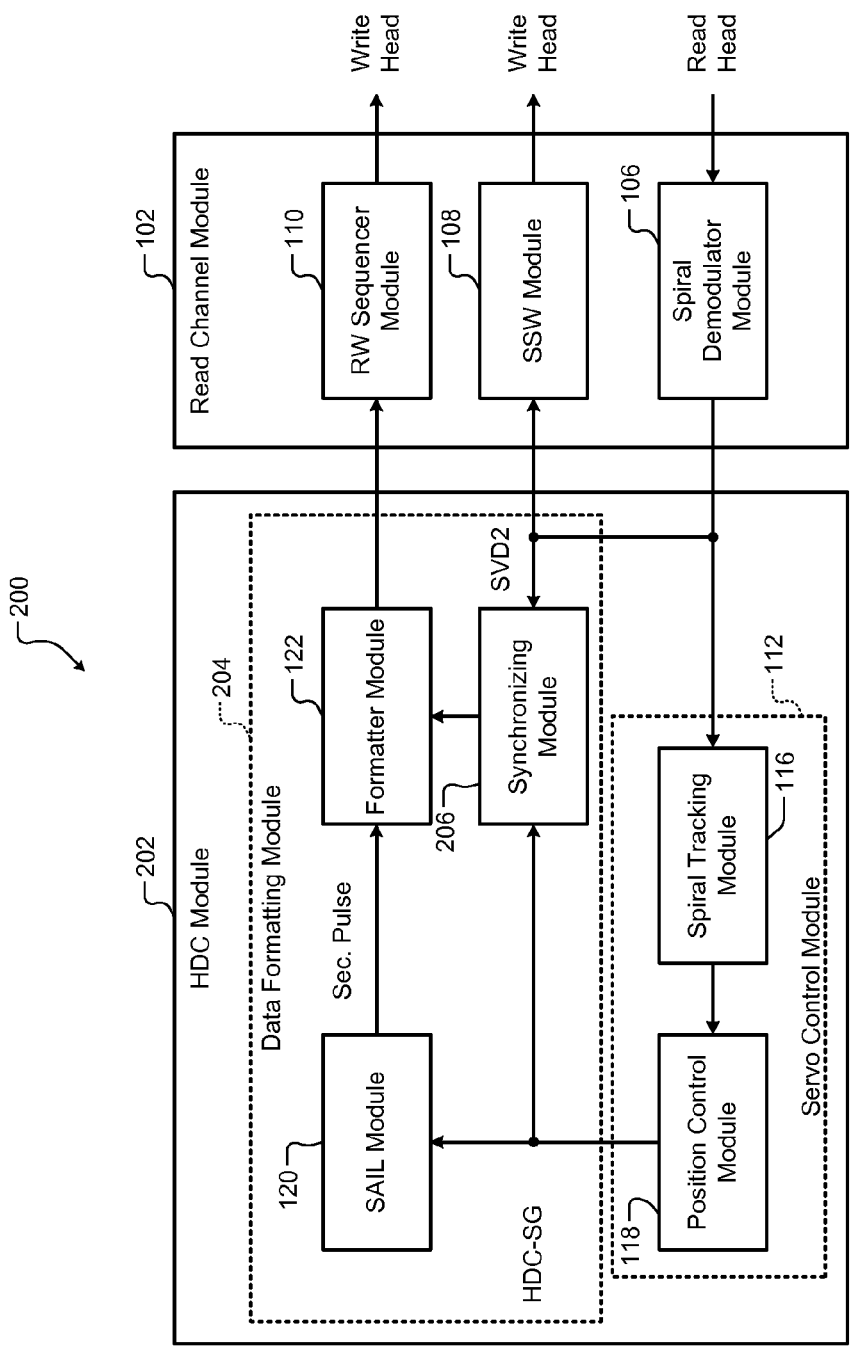
FIG. 3A is a functional block diagram of a system for writing/reading non-servo data based on servo spirals.
Figure 3C:
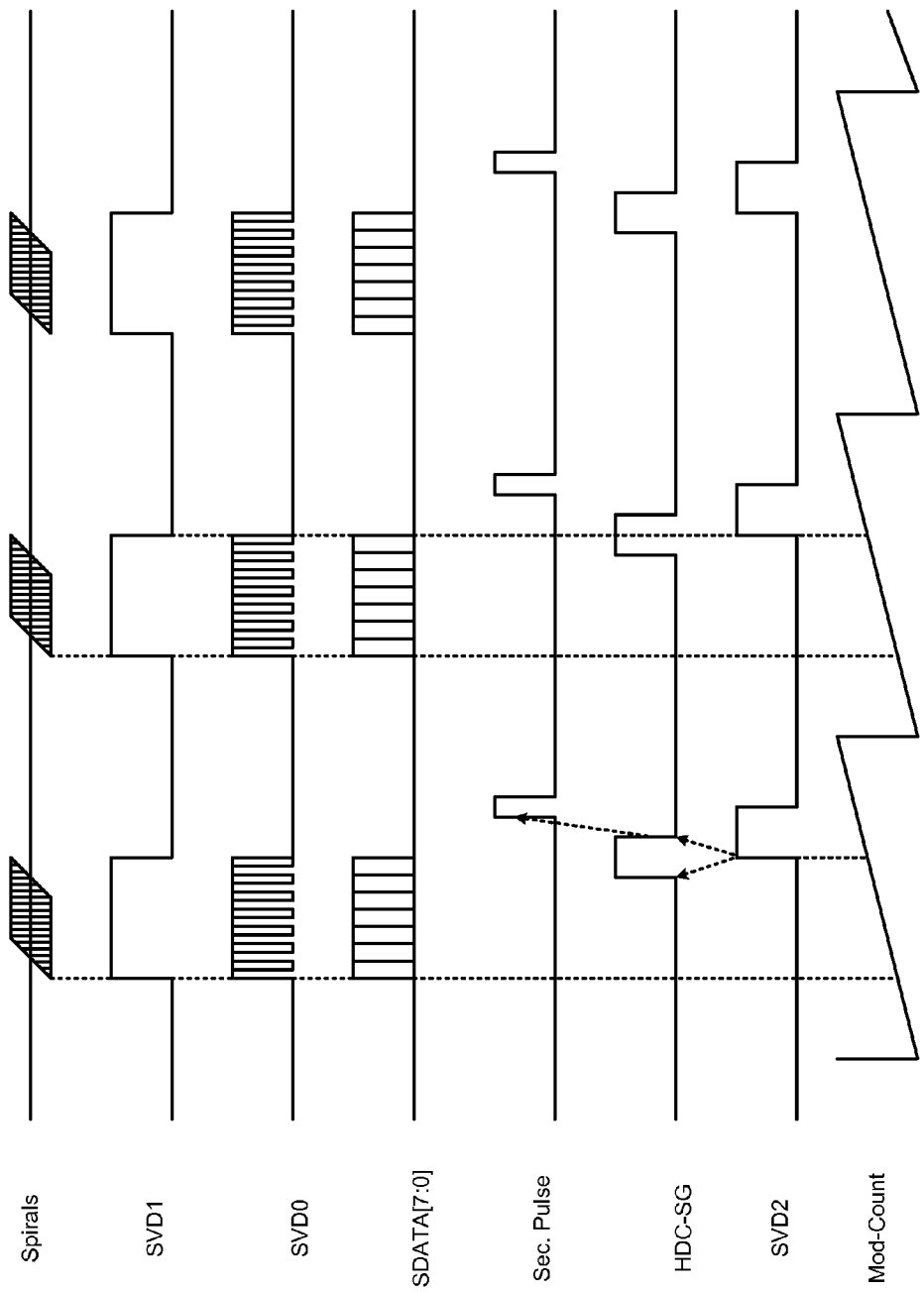
Figure 3D:
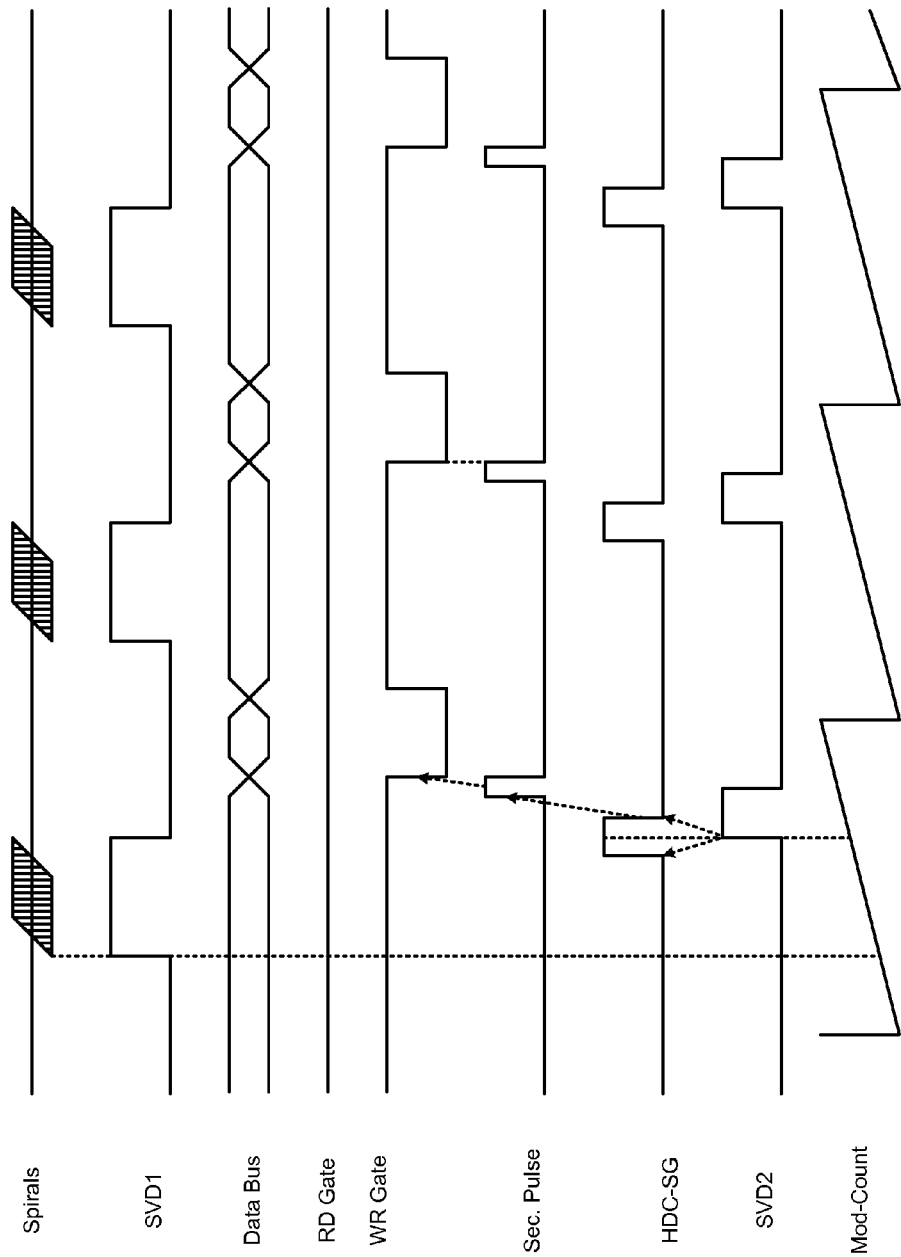

Referring now to FIGS. 3A-3E, a system 200 for writing/reading the non-servo data based on the servo spirals is shown. In FIG. 3A, the system 200 is shown. In FIGS. 3B-3D, timing diagrams of signals used by the system 200 are shown. Specifically, FIG. 3B shows synchronization of the HDC-SG signal to the SVD2 signal. FIG. 3C shows the sector pulse that is generated after the HDC-SG signal. FIG. 3D shows the non-servo data that is written during the write gate after receiving the sector pulse. FIG. 3E shows positioning of the SVD2 signal relative to the HDC-SG signal.

Referring to FIG. 3A, the system 200 comprises the read channel module 102 and a HDC module 202. The read channel module 102 comprises the spiral demodulator module 106, the SSW module 108, and the RW sequencer module 110. The HDC module 202 comprises the servo control module 112 and a data formatting module 204. The servo control module 112 comprises the spiral tracking module 116 and the position control module 118. The data formatting module 204 comprises the SAIL module 120, the formatter module 122, and a synchronizing module 206. The read channel module 102 and the HDC module 202 may be implemented in a SOC.

Initially, the SSW module 108 writes the servo spirals. The read channel module 102 reads the servo spirals. The spiral demodulator module 106 and the servo control module 112 generate position and timing signals based on the servo spirals. Using the position and timing signals, the data formatting module 204 and the RW sequencer module 110 write/read the non-servo data to/from the HDD.

The non-servo data is written to the HDD based on the servo spirals as follows. The read channel module 102 reads the servo spirals via the read head of the HDD and generates the read signals. The spiral demodulator module 106 demodulates the read signals and generates the SVD0, SVD1, SVD2, SDATA, and SPRL-SMF signals.

The spiral demodulator module 106 comprises the modulo counter (Mod-Count) 105 and the phase-locked loop (PLL) module 107. The modulo counter 105 synchronizes positioning of the demodulation window over the servo spirals during each revolution of the HDD. The PLL module 107 synchronizes a count of the modulo counter 105 to a peak of a servo spiral. The count indicates when the demodulation window is centered over the servo spiral. The read head reads the servo spiral when the modulo counter 105 reaches the count.

The spiral demodulator module 106 demodulates the read signals and generates the spiral clock (SVD0) and the spiral data (SDATA). Additionally, the spiral demodulator module 106 generates the SVD2 signal based on the read signals. The SVD2 signal is generated at the end of each demodulation window. The SVD2 signal is synchronized to the modulo counter 105. Accordingly, the SVD2 signal is synchronized to the servo spirals and to the disk rotation.

The signals SVD0, SVD1, SVD2, SDATA, and SPRL-SMF are output to the servo control module 112. The spiral clock SVD0 latches the spiral data (SDATA) into registers of the spiral tracking module 116. The spiral tracking module 116 tracks the servo spirals based on the spiral data. For example, the spiral tracking module 116 assigns identification numbers to the servo spirals and counts the servo spirals during each revolution. The spiral tracking module 116 generates the interrupt (SINT) when the spiral data is latched. The position control module 118 processes the spiral data when the interrupt is received. The position control module 118 determines the rotational position of the HDD based on the latched spiral data.

Additionally, the position control module 118 generates the HDC servo gate (HDC-SG) signal after each servo spiral. The SVD2 signal and the HDC-SG signal should be positioned immediately following the demodulation window (SVD1). The positioning of the SVD2 and HDC-SG signals can be achieved using two counts of the modulo counter 105. A first count may indicate a start of the demodulation window for each servo spiral. A second count may indicate when a write operation can begin after each spiral. The positioning may be determined using the following equation: First Count=(Second Count/4)+((Spiral Frame Size)*(Spiral Frame Count)).

The synchronizing module 206 receives the HDC-SG signal. The HDC-SG signal serves as the write enable signal for the data formatting module 204. Additionally, the synchronizing module 206 receives the SVD2 signal from the spiral demodulator module 106. The SVD2 signal indicates when the data formatting module 204 can begin writing the non-servo data after each servo spiral. The synchronizing module 206 synchronizes the HDC-SG signal to the SVD2 signal as follows.

The HDC-SG signal is gated to the formatter module 122 by the SVD2 signal instead of the SSMF signal. For example, the HDC-SG signal is gated by a leading edge of the SVD2 signal. The HDC-SG signal is centered on the leading edge of the SVD2 signal as shown in FIG. 3B. The formatter module 122 is triggered by the HDC-SG signal when writing/reading user data. For example, the formatter module 122 is triggered by a trailing edge of the HDC-SG signal. The SVD2 signal is synchronized to the servo spirals and the disk rotation. Accordingly, the data formatting module 204 is synchronized to the servo spirals and the disk rotation.

The data formatting module 204 writes/reads the non-servo data when the HDC-SG signal synchronized to the SVD2 signal is received. The data formatting module 204 writes/reads the non-servo data at the rotational position indicated by the position control module 118. The spiral enable (Splr-En) signal is held high for reading the servo spirals. The spiral enable signal is not held low since servo wedges are not yet written.

When writing the non-servo data, the SAIL module 120 generates the sector pulse when the HDC-SG signal is received as shown in FIG. 3C. The formatter module 122 formats the non-servo data when the sector pulse is received. The formatter module 122 outputs formatted non-servo data to the RW sequencer module 110 via the data bus. The formatter module 122 outputs the write gate signal (shown in FIG. 3D) to the RW sequencer module 110. The RW sequencer module 110 writes the formatted non-servo data to the HDD using write sequences.

Conversely, when reading the non-servo data from the HDD, the formatter module 122 outputs the read gate signal to the RW sequencer module 110 on receiving the sector pulse. The RW sequencer module 110 reads the non-servo data from the HDD using read sequences. The RW sequencer module 110 outputs the non-servo data to the formatter module 122 via the data bus.

Thus, the data formatting module 204 and the RW sequencer module 110 write/read the non-servo data to/from the HDD based on the servo spirals. The HDC module 104 processes information derived from writing/reading the non-servo data. The HDC module 104 may use the information to refine processes used by the SSW module 108 to write the servo wedges based on the servo spirals. The data formatting module 204 and the RW sequencer module 110 write user data based on the servo wedges during normal operation of the HDD.

Typically, the SVD2 signal is generated only when the SSW module 108 writes the servo wedges based on the servo spirals. Accordingly, the HDC module 202 may activate portions of the SSW module 108 to facilitate generation of the SVD2 signal when writing the non-servo data based on the servo spirals. Additionally, a pulse width of the SVD2 signal may be less than a pulse width of the HDC-SG signal as shown in FIG. 3E. Further, a pulse of the HDC-SG signal may overlap a pulse of the SVD2 signal as shown in FIG. 3E.

Figure 4:
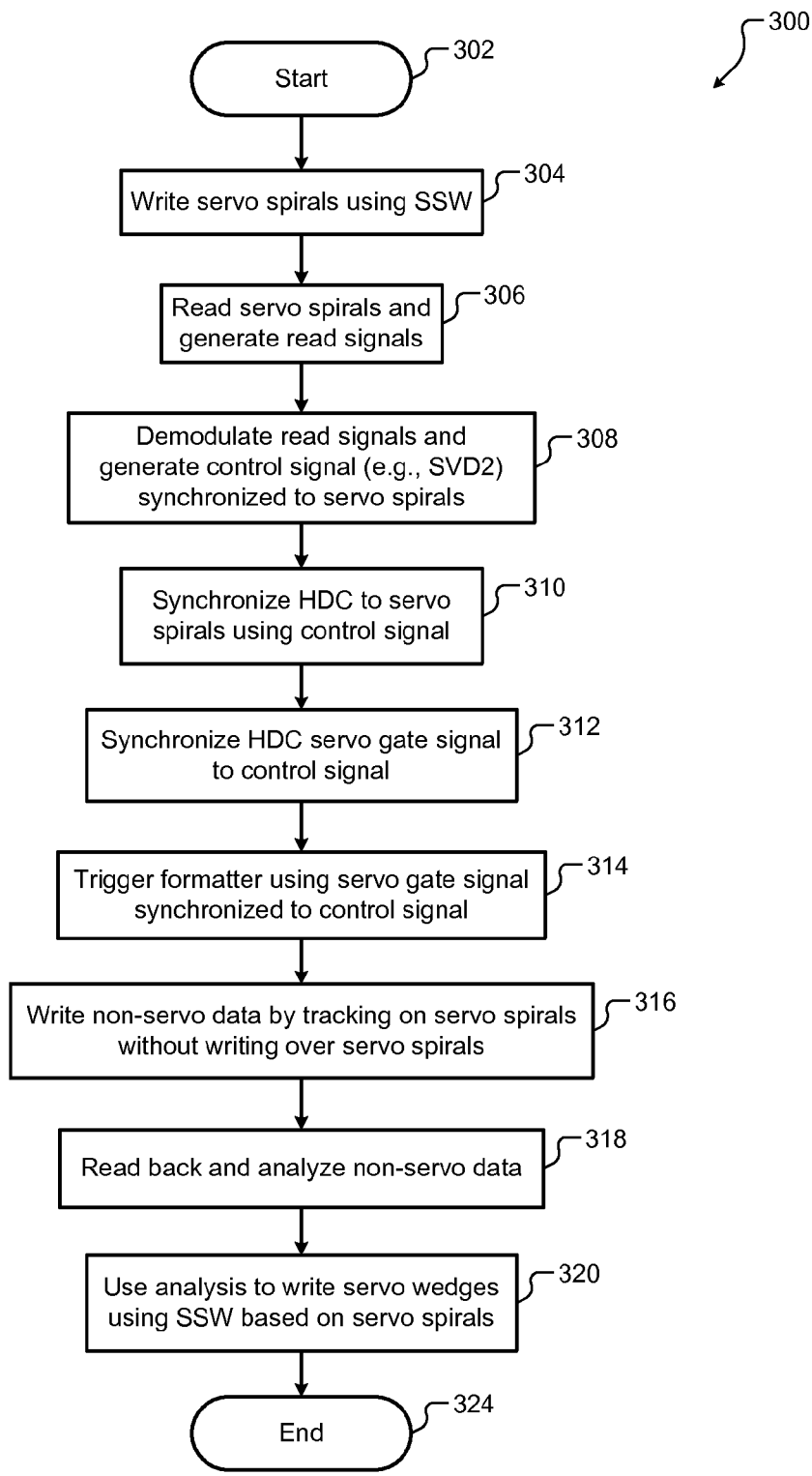
FIG. 4 is a flowchart of a method for writing/reading non-servo data based on servo spirals.

Referring now to FIG. 4, a flowchart of a method 300 for writing non-servo data using servo spirals is shown. Control begins in step 302. Control writes servo spirals on the HDD using SSW in step 304. Control reads the servo spirals and generates read signals in step 306. In step 308, control demodulates the read signals and generates a control signal (e.g., the SVD2 signal) that is synchronized to the servo spirals.

In step 310, control synchronizes the HDC module 202 to the servo spirals and to the disk rotation using the control signal. In step 312, control generates and synchronizes the HDC servo gate (HDC-SG) signal to the control signal (e.g., the SVD2 signal). In step 314, control triggers the formatter module 122 using the HDC-SG signal that is synchronized to the control signal. Thus, control synchronizes the formatter module 122 to the servo spirals and to the disk rotation using the control signal.

In step 316, control writes non-servo data on the HDD while tracking on the servo spirals. Control writes the non-servo data without writing over the servo spirals. Control reads back and analyses the non-servo data in step 318. In step 320, control uses information derived from the analysis and writes servo wedges on the HDD using SSW based on the servo spirals. Control ends in step 322.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system, comprising:
    a read module configured to generate read signals in response to reading, via a read head of a hard disk drive, spirals from a magnetic medium of the hard disk drive, wherein the spirals are pre-written on the magnetic medium and are used as a reference when subsequently writing, via a write head of the hard disk drive, servo wedges on the magnetic medium; and
    a write module configured to write, based on the read signals, via the write head, non-servo data on the magnetic medium (i) prior to writing the servo wedges on the magnetic medium and (ii) without writing over the spirals.

2. The system of claim 1, wherein the non-servo data:
    includes at least one of user data and a test pattern, and
    excludes the servo wedges.

3. The system of claim 1, wherein:
    the read module is configured to read, via the read head, the non-servo data from the magnetic medium prior to the write module writing the servo wedges on the magnetic medium; and
    the write module is configured to write the servo wedges on the magnetic medium based on information derived from reading the non-servo data from the magnetic medium.

4. The system of claim 1, further comprising:
    a hard disk controller module configured to generate a first control signal to control the write module;
    a spiral demodulator module configured to i) demodulate the read signals, and ii) generate a second control signal based on the demodulated read signals; and
    a synchronization module configured to synchronize the first control signal and the second control signal,
    wherein the write module is configured to write the non-servo data based on i) the first control signal and ii) the second control signal.

5. The system of claim 4, wherein the second control signal is synchronized to at least one of (i) the spirals and (ii) revolutions of the hard disk drive.

6. The system of claim 4, wherein a first pulse width of the first control signal is greater than or equal to a second pulse width of the second control signal.

7. The system of claim 4, wherein each of the first control signal and the second control signal includes a plurality of pulses, and wherein each pulse of the first control signal overlaps a corresponding pulse of the second control signal.

8. The system of claim 4, wherein the write module is configured to write the servo wedges on the magnetic medium based on the second control signal.

9. The system of claim 4, wherein:
    the read module is configured to read, via the read head, the non-servo data from the magnetic medium; and
    the write module is configured to write the servo wedges based on i) the second control signal, and ii) information derived from reading the non-servo data read from the magnetic medium.

10. The system of claim 9, further comprising:
    a servo read module configured to (i) read the servo wedges, and (ii) detect sync marks; and
    a servo control module configured to generate a sync mark signal based on the sync marks,
    wherein the synchronization module is configured to synchronize the first control signal to the sync mark signal, and
    wherein the write module is configured to write, via the write head, user data on the magnetic medium based on i) the first control signal and ii) the sync mark signal.

11. A method, comprising:
    generating read signals in response to reading, via a read head of a hard disk drive, spirals from a magnetic medium of the hard disk drive, wherein the spirals are pre-written on the magnetic medium and are used as a reference when subsequently writing, via a write head of the hard disk drive, servo wedges on the magnetic medium; and
    writing, based on the read signals, via the write head, non-servo data on the magnetic medium (i) prior to writing the servo wedges on the magnetic medium and (ii) without writing over the spirals.

12. The method of claim 11, wherein the non-servo data:
    includes at least one of user data and a test patters, and
    excludes the servo wedges.

13. The method of claim 11, further comprising:
    reading, via the read head, the non-servo data from the magnetic medium; and
    writing the servo wedges on the magnetic medium based on information derived from reading the non-servo data from the magnetic medium.

14. The method of claim 11, further comprising:
    generating a first control signal to control write operations;
    demodulating the read signals, and generating a second control signal based on the demodulated read signals;
    synchronizing the first control signal and the second control signal; and
    writing the non-servo data based on i) the first control signal and ii) the second control signal.

15. The method of claim 14, further comprising synchronizing the second control signal to at least one of (i) the spirals and (ii) revolutions of the hard disk drive.

16. The method of claim 14, wherein a first pulse width of the first control signal is greater than or equal to a second pulse width of the second control signal.

17. The method of claim 14, wherein each of the first control signal and the second control signal includes a plurality of pulses, and wherein each pulse of the first control signal overlaps a corresponding pulse of the second control signal.

18. The method of claim 14, further comprising writing the servo wedges on the magnetic medium based on the second control signal.

19. The method of claim 14, further comprising:
reading, via the read head, the non-servo data from the magnetic medium; and
writing the servo wedges on the magnetic medium based on i) the second control signal, and ii) information derived from reading the non-servo data from the magnetic medium.

20. The method of claim 19, further comprising:
reading the servo wedges and detecting sync marks;
generating a sync mark signal based on the sync marks;
synchronizing the first control signal to the sync mark signal; and
writing, via the write head, user data on the magnetic medium based on i) the first control signal and ii) the sync mark signal.

* * * * *